United States Patent [19]

Higginbotham et al.

[11] 3,841,853

[45] Oct. 15, 1974

[54] APPARATUS FOR PRODUCTION OF THERMOPLASTIC MATERIALS

[75] Inventors: James M. Higginbotham, Newark, Ohio; William G. Wardlaw, Sr., Anderson, S.C.

[73] Assignee: Owens-Corning Fiberglas Corporation, Toledo, Ohio

[22] Filed: Sept. 5, 1972

[21] Appl. No.: 286,503

[52] U.S. Cl. .................................................. 65/12
[51] Int. Cl. ............................................. C03b 37/02
[58] Field of Search .......................... 65/1, 12, 2, 11

[56] References Cited
UNITED STATES PATENTS

| | | | |
|---|---|---|---|
| 2,706,365 | 4/1955 | Stalego | 65/12 |
| 3,334,981 | 8/1967 | Glaser | 65/12 |
| 3,468,643 | 9/1969 | Stalego et al. | 65/12 X |
| 3,554,718 | 1/1971 | Stalego et al. | 65/12 X |

*Primary Examiner*—Robert L. Lindsay, Jr.
*Attorney, Agent, or Firm*—Carl G. Staelin; John W. Overman

[57] ABSTRACT

A method and apparatus for maintaining a plurality of heat sources such as fiber forming streams or cones beneath a molten glass feeder at a substantially uniform viscosity by use of heat absorbing means disposed adjacent to each stream or cone to conduct heat away from the stream to a heat sink. The heat absorbing means being positioned at different distances from the bottom of the glass feeder to eliminate variations in feeder temperatures and to compensate for predictable deformations in the feeder so that all the emerging streams of glass have substantially the same viscosity and the fibers formed therefrom are more uniform in diameter.

3 Claims, 5 Drawing Figures

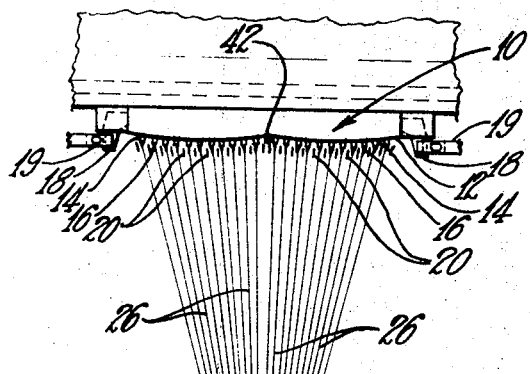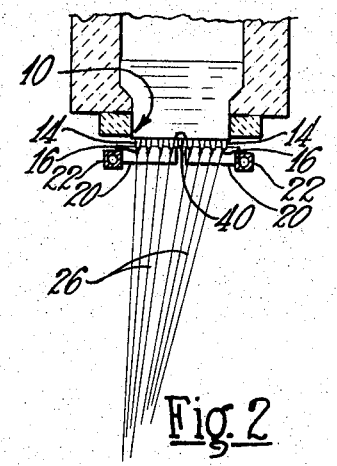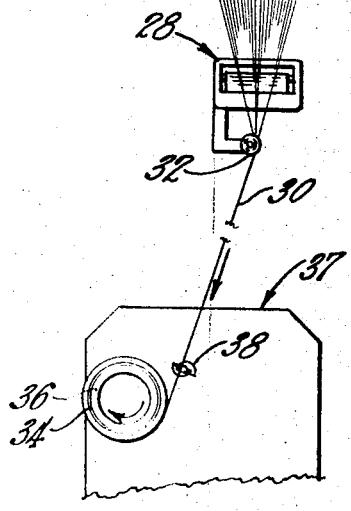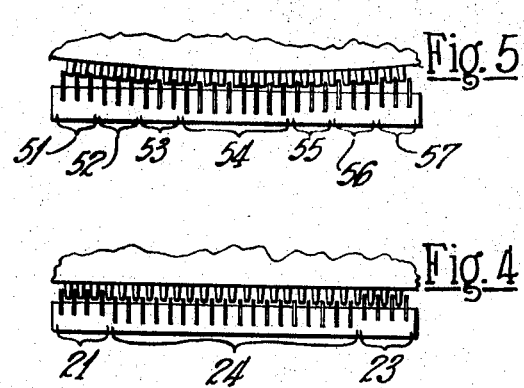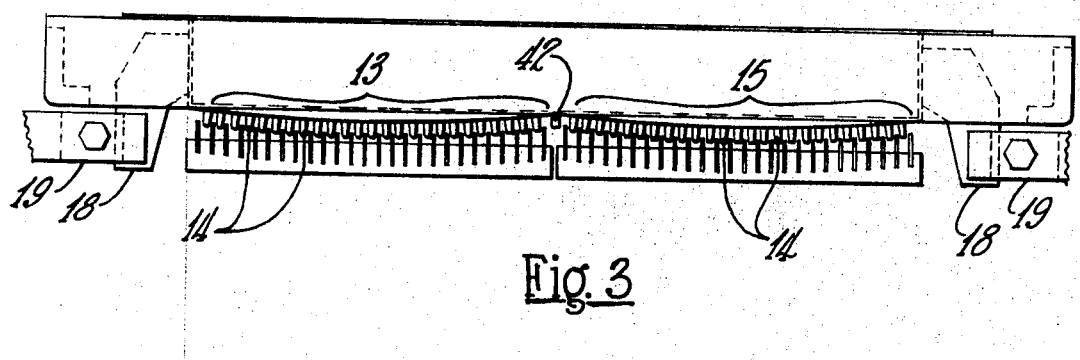

APPARATUS FOR PRODUCTION OF THERMOPLASTIC MATERIALS

BACKGROUND OF THE INVENTION

This invention relates to a method and apparatus for the production of fibers from heat-softenable fiber-forming material, such as glass, and more especially to a new shield structure which creates a more uniform and stable environment for forming fibers during the life of the feeder. The invention also relates to a method and apparatus for extending the effective useful life of the fiber forming feeder.

The invention is herein exemplified by reference to the production of continuous glass fibers wherein streams of molten glass are attenuated mechanically into continuous fibers of small diameter and then grouped into a strand and wound onto a package.

The process of producing continuous fibers of glass involves flowing streams of molten glass from orifices of an electrically heated metal feeder or bushing associated with a container reservoir in which the glass material is heated to a molten condition. Projecting tips or nipples are usually provided in the bottom wall of the feeder with orifices formed in the tips from which the glass flows in the form of streams. The orifices may also be formed in other structural arrangements such as a flat plate feeder. Upon emission to the atmosphere each of the streams of glass tapers down, as determined by its viscosity and surface tension, to form a cone-like configuration from the tip of which a continuous fiber is drawn. If the temperature of the emerging glass is either too cold or too hot, it is impossible to form continuous fibers therefrom. For instance, if the temperature of the glass is too high, the molten glass becomes so liquid that it eventually reaches a point where the surface tension will actually constrict the glass into beads or droplets instead of maintaining a consistant continuously flowing stream. On the other hand, too low a temperature or too high a viscosity in such molten glass offers higher resistance to flow and thickens to such an extent that the resistance of the glass to the attenuating forces results in fiber rupture. Therefore, a general range of temperatures and glass viscosities exist within which it is possible to form fibers but outside of which continuous fiber formation is impossible.

To help maintain proper viscosity within this temperature range, apparatus has been introduced to the art in the form of water-cooled fin shield members which are disposed immediately adjacent the fiber-forming cones in non-contacting relation with the feeder. These members extend generally parallel and between the rows of cones at least from the level of the base of the cones to the general level of the apices of the cones. They are designed to absorb heat from the cones and to divide the total number of tips and their respective cones into smaller groups. At the same time, the fins make operating conditions less critical to temperature variations due to turbulences in the surrounding atmosphere. By the provision of cooled shield members in the zone of fiber formation, the rate of cooling of the glass emitted from the feeder is not left to the variant conditions of the atmosphere. Rather, the fin members provide more positive control of the rate of cooling and make the conditions of fiber formation more certain. An additional feature which resulted from the adoption of shield members for fiber-forming operations was the increase in the number of rows of orifices or tips in a given feeder from which fibers could be attenuated. The increased number of rows are highly desirable because for a given size of feeder a greater number of filaments can be produced. Correspondingly, the need for precious metal such as platinum which is usually used in glass fiber feeder constructions is reduced.

The fin structures have improved fiber forming efficiencies tremendously. They have made it possible to maintain all the glass cones closer together and within the general fiber forming temperature range. Nonetheless, there still exists variations in temperatures from cone to cone along the length of the orificed feeder wall. Because some of the glass streams or cones are hotter than others, the fibers formed therefrom are larger in diameter. This non-uniformity of fiber diameter is undesirable. Therefore a need exists for improving fin structures to make them more effective at removing heat. Specifically, a more even heat pattern across the entire face of the orificed feeder is desirable. A more even heat pattern would result in more uniform fibers formed therefrom.

Another limitation on the effectiveness of conventional fin structures is the inevitable deformation or sag of some feeders. When a feeder is new, the alignment of the fin shields is relatively easy because the orifice or bottom plate of the feeder is flat. However, an operating feeder is subjected to glass load and to high temperatures as well as to the tension caused by attenuation of the fibers. Such stresses act upon the metal in the feeder in such a way as to cause the metal to sag. The effect is similar to a cardboard box full of sand in that the tip section or bottom bulges. As the feeder sags, fin member alignment becomes more difficult. Therefore, not all tips are properly or equally shielded. Operating experience has shown that a feeder of this nature cannot operate at peak efficiency. This is evidently due to the ever-widening variations in tip operating temperatures.

To eliminate this improper alignment, different approaches toward the reduction of bushing sag have been taken. One approach is to improve the high temperature strength of the feeder metal with new alloys. A platinum and rhodium alloy having about 25 percent rhodium has been found to have the most satisfactory strength characteristics. Another approach is to support the feeder tip section with physical supports. Although these approaches have substantially reduced bushing sag, they have not eliminated it. And because the feeders are now larger and operating at higher temperatures to increase production, the problem of sag has likewise increased. Thus a difficulty is presented in the maintenance of the correct spaced relationship between the fin shields and the tips. Eventually, the feeder sag becomes so excessive that uniform, satisfactory fibers can no longer be produced. And the feeder must be replaced.

Therefore, if means can be provided to extend the useful life of the fiber-forming feeder, as well as maintain more uniform feeder temperatures, a substantial contribution would be made to the art.

SUMMARY OF THE INVENTION

Accordingly, it is an object of this invention to provide a more efficient method and means for the production of continuous fibers of glass wherein fin shield members are used for stabilization of the fiber-forming operation, which fin shield members are designed to compensate for sag in the feeder orifice plate.

In brief, the invention improves prior glass fiber-forming operations by selectively providing greater cooling in the areas of the feeder found to require the greatest amount of heat removal. Specifically, the fin members are positioned relatively near typically higher temperature areas of the feeder tip section to help maintain all of the glass streams which flow from the feeder at substantially the same viscosity.

Furthermore, where the feeder is subject to inevitable predetermined sag, another factor influencing the proximity of the fins to the feeder is introduced. In such instances, the fin members are placed as close to the areas of least feeder sag and as far away from the areas of greatest sag which will still allow satisfactory fibers to be formed. Typically, for a new feeder subject to later sag, the fin members under the center section of the feeder are further from the feeder than the fin members positioned under the end sections of the feeder.

These are several advantages of such customizing of fin member heights to match the temperatures and deformation conditions of the feeder. The startup of fiber-forming is faster. There is a greater uniformity of fibers. The effective useful life of the feeder is increased. There are fewer process interruptions and thus there is greater continuity of operation throughout the life of the feeder.

BRIEF DESCRIPTION OF THE DRAWINGS

FIG. 1 is a view of a general layout of apparatus including shielding components for the production of glass or other heat-softened material into attenuated fine continuous filaments.

FIG. 2 is an enlarged side elevational view partly in cross section of the glass feeder and associated shield construction shown in FIG. 1.

FIG. 3 is a front elevational view of one embodiment the environmental control means of the present invention.

FIG. 4 is a front elevational view of another embodiment of the environmental control means of the present invention.

FIG. 5 is a front elevational view of another embodiment of the environmental control means of the present invention.

DESCRIPTION OF THE PREFERRED EMBODIMENT

As shown in FIGS. 1 and 2, continuous glass fibers are produced using a glass stream feeder or bushing 10 of generally elongated, rectangular configuration. The glass stream feeder 10 has a bottom wall or base plate 12 having a plurality of orifices or tips 14 formed therein from which streams 16 of heat-softened glass flow. The stream feeder 10 is provided at each end with an electrical terminal 18. Electrical current is supplied to each terminal by heavy bus bars 19 to heat the feeder by its own resistance to glass melting temperatures. Positioned beneath the feeder 10 are fin members 20 which are connected to a water cooled manifold 22. In operation the fin members remove heat from the glass streams 16 as they are emitted from the orifices 14 thus raising the glass viscosity to within the desired fiber forming range.

In the production of glass fibers, the glass constituents are first melted in a furnace (not shown) and conveyed to the stream feeder 10 by way of a forehearth (not shown). The heat-softened glass enters the feeder and is maintained in molten condition by the heat generated therein. The glass flows downwardly through the orifices 14 in the base plate 12 as small molten streams 16. These small molten glass streams are then attenuated or drawn into filaments 26. The filaments 26 are coated with a sizing from an applicator 28 and are gathered into a strand 30 at a gathering guide 32. From the gathering guide 32, the strand 30 passes downwardly and is wound on a tube 34 mounted on a rotating mandrel 36 of a winder 37. The rotation of the mandrel 36 provides the attenuating force for forming the fibers. As the strand 30 is wound, it is moved to and fro across the surface of the tube by a traverser 38.

To withstand the rigorous temperatures encountered in glass melting and to resist corrosion, the feeder 10 is made of an alloy such as platinum and rhodium. This alloy, though very resistant to high temperatures and corrosion, is nonetheless ductile. Accordingly, it is readily deformable, particularly when red hot, as it is at glass melting temperatures. Adding to the deformation problem is the increase in the number of orificed tips 14 provided in the base plate 12. To accomodate the several hundred orificed tips needed for economical operation, the total floor area is substantial. Therefore, in addition to the special alloys, support means are arranged both lengthwise 40 and crosswise 42 of the stream feeder 10. The supports 40 and 42 help protect against bending stresses and strains thus reducing the amount of distortion or sag of the feeder tip section 12. In spite of the higher strength alloys and the support means 40 and 42, the feeder still tends to sag thus bindering fiber forming operations.

To promote the satisfactory formation of glass streams 16 of uniform size and characteristics, it is highly desirable to flow the glass through the orificed tips 14 at a comparatively low viscosity in a highly liquidus state. On the other hand, it is essential to increase the viscosity of the glass streams adjacent the exterior of the tips to satisfactorily attenuate fine filaments from the streams. Therefore, means are provided for conveying heat away from the glass streams to raise the viscosity. As particularly shown in FIG. 2, tubular members of manifolds or headers 22 are disposed at opposite sides of the streams and extend lengthwise of the feeder or bushing 10. Extending laterally from the manifolds 22 are vanes or fin members 20. Each member extends between adjacent transversely arranged rows of tips 14. The fins are fused, welded or otherwise secured to the manifolds in heat conducting relation therewith. The manifolds are arranged to accomodate a circulating cooling fluid, for example, water. The fins absorb or withdraw heat from the streams and the heat conducted by the fins to the manifolds is carried away by the circulating fluid. The water can be passed through the manifold at a controlled rate of flow and at temperatures predetermined to establish desired temperature differentials between the fins and the glass emitted from the feeder tips. Through this arrangement, the withdrawal or extraction of heat from the streams of glass increases the viscosity of the glass to promote efficient attenuation of the streams to fine filaments. Members of refractory (not shown) may be disposed between the manifolds 22 and the edge regions of the feeder floor 12 to assure that the manifold 22 is out of contact with and insulated from the feeder 10.

In operation the fin member stabilizes the cones or streams from which the glass fibers are attenuated by controlling absorption of heat from the glass which promotes stability thereto in its fiberization range, and by reducing the disrupting erratic effects of air eddies about the cone as may be caused by both thermal differential conditions and motions of the glass.

One of the essential characteristics for producing fine filaments of substantially uniform size resides in flowing streams of heat-softened glass of substantially the same size and viscosity from all of the orifices. If the viscosity of the heat-osftened glass is too high, the tension required to be applied to the cool fibers to effect attenuation of the cone can be so high as to result in breakage of the fiber. At the more fluid end of the viscosity range, however, the glass flows more freely and the balance of surface tension becomes somewhat indefinite which causes a form of pumping action or dancing movement of the cones at the feeder tips. A further lowering of the viscosity of the glass results in an approach towards constriction by the surface tension to the extend that discontinuous separate droplets of the fluid are formed.

A range of viscosities therefore exists within which fiberization of the glass can be accomplished but above and below which fibers are difficult or impossible to form. When stream flow interruptions or broken filaments occur, it is then necessary for an operator to interrupt attenuation operations and restart the winding and attenuation of the filaments to secure streams flowing from all the tips to assure the proper number of filaments in the strand. Continuous operation is essential in the continuous production of uniform fine filaments for textile uses as frequent interruptions and down time makes the cost prohibitive.

Even with the added improvements resulting from the use of fin members, there remains some variation in temperature along the length of the orificed wall of the feeder. The most direct result of such temperature variations is a difference in fibers formed therefrom. It has been found that by customizing the fin heights to match the variant temperature conditions of the feeder that a more uniform heat pattern results. Thus it is possible to make more uniform fibers.

FIG. 3 shows a typical feeder with the selectively positioned fin members of the present invention. The proximity of the fin members 20 to the feeder bottom or tip section 12 is varied according to the relative temperatures of the cones emitted from an unshielded tip section. The tip sections 12 of the larger or higher throughput feeders are typically hotter in the areas near the terminals 18 and near the feeder support 42. According to this invention, some of the fins are positioned relatively closer to these typically hotter regions. The fins which are relatively closer to the feeder appear to remove more heat from the approximate regions of the feeder thus creating a more uniform overall heat pattern.

Experience has shown this arrangement to definitely improve fiber forming operations by making the exit viscosity of the glass from all the tips more nearly the same. It is found that the time required for beads to form and drop is a good indication of the uniformity of the heat pattern. Beads of glass form at the face of the tips when the attenuating force is interrupted and they will eventually drop of their own accord. Beads which fall first indicate hotter areas of the tip sections. Beads that fall last indicate colder areas. On one of the larger types of feeders using this invention, the time between first and last beadfall has been reduced by over thirty percent. Therefore this invention has utility in helping to establish more uniform heat patterns on feeders.

FIG. 4 illustrates another feeder 10 wherein the fins 20 are positioned to facilitate maintenance of uniform heat pattern on the operating feeder. In that embodiment, only the four fins 21 adjacent the terminal ends and the four fins 23 adjacent the support areas are closer to the tip section than the fins 24 at the center of the tip section. They are positioned closer to those areas of the tip section to remove more heat and establish a more uniform heat pattern across the total feeder tip section 12. For other feeders, the exact position and number of such fins depends on the particular heat pattern generated by the feeder.

FIG. 3 illustrates another important feature of the present invention which is the extension of the useful life of the sagging feeder. It is inevitable on some feeders that the bottom tip sections 12 will eventually sag as much as one-eighth to one-fourth inch. Nonetheless, it has been found that deformed feeders can still remain operable if the exiting glass streams can all be maintained within the general fiberforming viscosity range. In such instances some uniformity of fibers is given up in favor of extending the life of the feeder.

When the bushing or feeder is relatively new, the feeder bottom is straight and conventional fins cover the tips uniformly as shown in prior art patents such as 2,908,036. The glass cones or streams 16 emitted from the tips 14 are therefore of relatively uniform viscosity. However, this uniform coverage occurs only during the early stages of feeder life. After the feeder has been in operation for a time, the stresses resulting from the high temperatures, the glass weight and the tension caused by attenuation cause the bottom or tip sections 13 and 15 of the feeder to begin to sag. The more the feeder sags, the more uneven the fin coverage or shielding becomes. Sometimes the fins are lowered to prevent the center tips from touching the fins. This results in less fin shielding of the tips near the end of the feeder. Eventually, the shielding is so uneven that it is impossible to make continuous glass fibers. And the feeder must be replaced.

However, since the sag is predictable, it is possible to use the selectively positioned fins of the present invention to reduce the undesirable effect of sag. For example, a feeder having a uniform heat pattern and equipped with a conventional fin structure may sag to the extent that fibers can no longer be formed therefrom. Thereafter, the conventional fin structure may be replaced with a fin structure having fins at various heights. The relative placement of the fin members is determined by the extent of sag; the fins are positioned so that all the cones are equally shielded. This replacement procedure does interrupt production for a short time. But, it has been found that the useful fiber forming life of the feeder is increased. Furthermore, it is much easier to replace the fin structure than to replace the entire feeder.

On some feeders, it is possible to adequately reduce the effects of sag without having to change or replace shield structures. For many feeders, such as the one shown in FIG. 3, the preferred positioning of the fins to compensate for sag coincides with the preferred fin placement for maintaining a uniform heat pattern. With such feeders, the varied height fins may be installed when the feeder is new and does not yet have any sag. Typically the feeder is hotter in the areas near the end terminals and the supports; coincidentally, these areas are also the areas of least sag. On the other hand, the center areas of the feeder tip sections 13 and 15 are cooler; and these areas are also the ones subject to greatest sag. Accordingly, on feeders having these characteristics, it is possible to maximize feeder life by placing the fins which are beneath the hotter and supported areas closer to the feeder and by placing the fins which are beneath the unsupported or sagging portions as far from the feeder as possible.

In positioning the fin members, it must be remembered that the critical factor is glass cone temperature and viscosity. Although it may be desirable to position the fin members far away from the sagging feeder, the fins must be close enough to sufficiently cool the cones to within the fiber forming range of viscosities.

The relative position of the fins may vary greatly depending on the feeder and the objectives of the fiber-forming operation. On some sagging feeders, it may be more important to maintain continuous production than to have uniform fibers. Therefore, rather than start with the cones at the same uniform temperature, it may be better to start with all the fins as far away from the feeder as possible. This will result in the cones being at the upper fiber-forming temperature limit. Then as the feeder sags, the cones will move closer to the fins and will be progressively cooled more and more. Accordingly, the cones will be within the fiber-forming temperature range for a longer period of time. The cones will start producing fibers at one temperature extreme and will end the production of fibers at the other temperature extreme.

The amount of time the useful life of a feeder is extended varies depending upon the type of feeder, the size of the tip sections, the operating temperature of the feeder and the amount of glass which flows through each tip per unit of time. In some instances, the useful life of the feeders has been extended by over twenty-five percent by using this invention.

In conjuncture with fin member placement, other factors can be modified to aid or improve the fin structure objectives. For example, the heat pattern can be influenced or changed somewhat by adjusting or moving the bus bars 19 at the point where they connect to the terminals 18. Also, the overall operating temperature is measured by thermocouples and controlled by varying the current supplied to the terminals. This too can be manipulated to help improve the fiber-forming environment.

Although the fin structure may perform best when the distance of each fin from the feeder floor is exactly matched to the temperature and sag characteristic, it may be best from a fabrication standpoint to compromise. For example, FIG. 5 illustrates a fin shield configuration in which the fins are grouped into sections 51, 52, 53, 54, 55, 56 and 57 so they only approximate the eventual feeder sag. As shown, the fins of sections 51 and 57 are closest to the feeder and the fins of section 54 are furthest from the feeder. Since several fins are placed at the same distance from the feeder, rather than each fin having its own singular position as shown in FIG. 3, the fin structure is much easier to fabricate. More importantly, the fin structure configuration shown in FIG. 5 has been found to operate satisfactorily.

Varying the spaced relation of the fins to the feeder is the preferred arrangement for accomplishing the selective cooling of the cones. The placement of fins in the manifold is a relatively easy manufacturing change. Furthermore, it does not require any changes from conventional components. All that is needed is a special jig to hold the fins in position while connecting them to the manifold.

Another relatively simple way to make the invention is to use different sizes of fins. The lower edges of the fins may be kept on the same plane at the general level of the apices of the cones. But the size or height of the fins may be varied so that the top edge of some of the fins are closer to the feeder as needed. Furthermore, it is also understood that other methods are also possible and are within the scope of providing cooling in the region of the feeder found to require greater cooling. It is possible to selectively use more efficient heat sinks to create a uniform heat pattern. For example, water cooled fin members, coated fin members, fin members made of a special heat conducting material, or porous fin members that conduct cooling air may be used to remove extra heat from the hotter regions.

Only direct melt feeders are shown. However, the invention is generally applicable to all fiber forming feeders where deformation of the feeder or non-uniform temperatures along the feeder is present.

It is apparent that, within the scope of the invention, modifications and different arrangements may be made other than those disclosed herein, and the present disclosure is illustrative merely, the invention comprehending all variations thereof.

We claim:

1. Apparatus for producing filaments of glass, comprising:

a container for molten glass having rows of orifices formed in an elongated wall from which streams of molten glass may flow, the orificed wall tending to develop regions at its ends of greater temperature that promotes discharge of hotter streams from orifices in these regions during filament formation;

means for attenuating the streams from the orifices to form fine filaments; and side-by-side thin longitudinal shield members spaced from the orificed wall and aligned with the rows of orifices such that the shield members will subdivide the total number of streams into smaller groups, shield members adjacent the hotter stream emitting orifices in the end regions of the orificed wall being located in closer spaced relationship with such wall than the other shield members outside the end regions to even out thermal conditions and thereby promote streams having substantially the same filament forming temperature characteristics in all regions of the orificed wall during filament attenuation.

2. Apparatus producing glass filaments, comprising:

a heated feeder holding molten glass, the feeder having an orificed wall emitting streams of the molten glass, the orificed wall of the heated feeder having temperature zones of substantially fixed locations adjacent some of its orifices which are greater than the temperatures adjacent other of the orifices;

means attenuating the streams to fine glass filaments; and environmental control means associated with the feeder but out of contact therewith comprising thin longitudinal fin members in side-by-side relationship so that each of the fin members extends in spaced relation adjacent at least one row of streams, the fin members being positioned closer to the orificed wall in the greater temperature zones than the fin members outside such zones to promote substantially the same temperature characteristics for all of the molten glass streams.

3. Apparatus for producing filaments of glass, comprising:

a container for molten glass having rows of orifices formed in an elongated bottom wall from which streams of molten glass flow, the orificed wall tending to develop regions at its ends of greater temperature that promotes discharge of hotter streams from orifices in these regions during filament formation;

means for attenuating the streams downwardly from the orifices to form filaments; and side-by side thin longitudinal shield members spaced below the orificed bottom wall and aligned with the rows of orifices such that they will subdivide the total number of streams into smaller groups, the upper edges of the shield members adjacent the hotter stream emitting orifices at the end regions of the orificed wall being located above the upper edges of the remaining shield members and consequently in closer spaced relationship with such wall to even out thermal conditions and thereby promote streams having substantially the same filament forming temperature characteristics during filament attenuation.

* * * * *